United States Patent [19]
Simpson et al.

[11] Patent Number: 5,405,503
[45] Date of Patent: Apr. 11, 1995

[54] PROCESS FOR DESALINATING WATER WHILE PRODUCING POWER

[76] Inventors: Gary D. Simpson, 15434 Tadworth Dr., Houston, Tex. 77062; Karl Lin, 13131 Fallsview La., #725, Houston, Tex. 77077

[21] Appl. No.: 147,884
[22] Filed: Nov. 5, 1993
[51] Int. Cl.$^6$ .......................... B01D 3/34; C02F 1/04; C02F 1/42
[52] U.S. Cl. ........................ 203/10; 60/648; 159/DIG. 39; 203/4; 203/7; 203/DIG. 17; 203/DIG. 20; 210/687; 210/673
[58] Field of Search .................... 203/10, DIG. 17, 43, 203/DIG. 20, 42, 7, 4, 34; 210/673, 687; 202/176; 60/641.9, 641.8, 648; 159/DIG. 39

[56] References Cited

U.S. PATENT DOCUMENTS

| | | | |
|---|---|---|---|
| 3,367,845 | 2/1968 | Coit et al. | 203/DIG. 17 |
| 3,476,653 | 11/1969 | Doland | 203/DIG. 20 |
| 3,489,652 | 1/1970 | Williamson | 203/DIG. 20 |
| 3,557,863 | 1/1971 | Becker | 203/49 |
| 4,347,704 | 9/1982 | Marquardt et al. | 203/DIG. 20 |
| 4,392,959 | 7/1983 | Coillet | 210/651 |
| 4,770,790 | 9/1988 | Oberhofer | 210/673 |

*Primary Examiner*—Virginia Manoharan
*Attorney, Agent, or Firm*—Kenneth A. Roddy

[57] ABSTRACT

A process and apparatus for desalinating seawater or brine and purifying water which contains minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials are returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously.

9 Claims, 1 Drawing Sheet

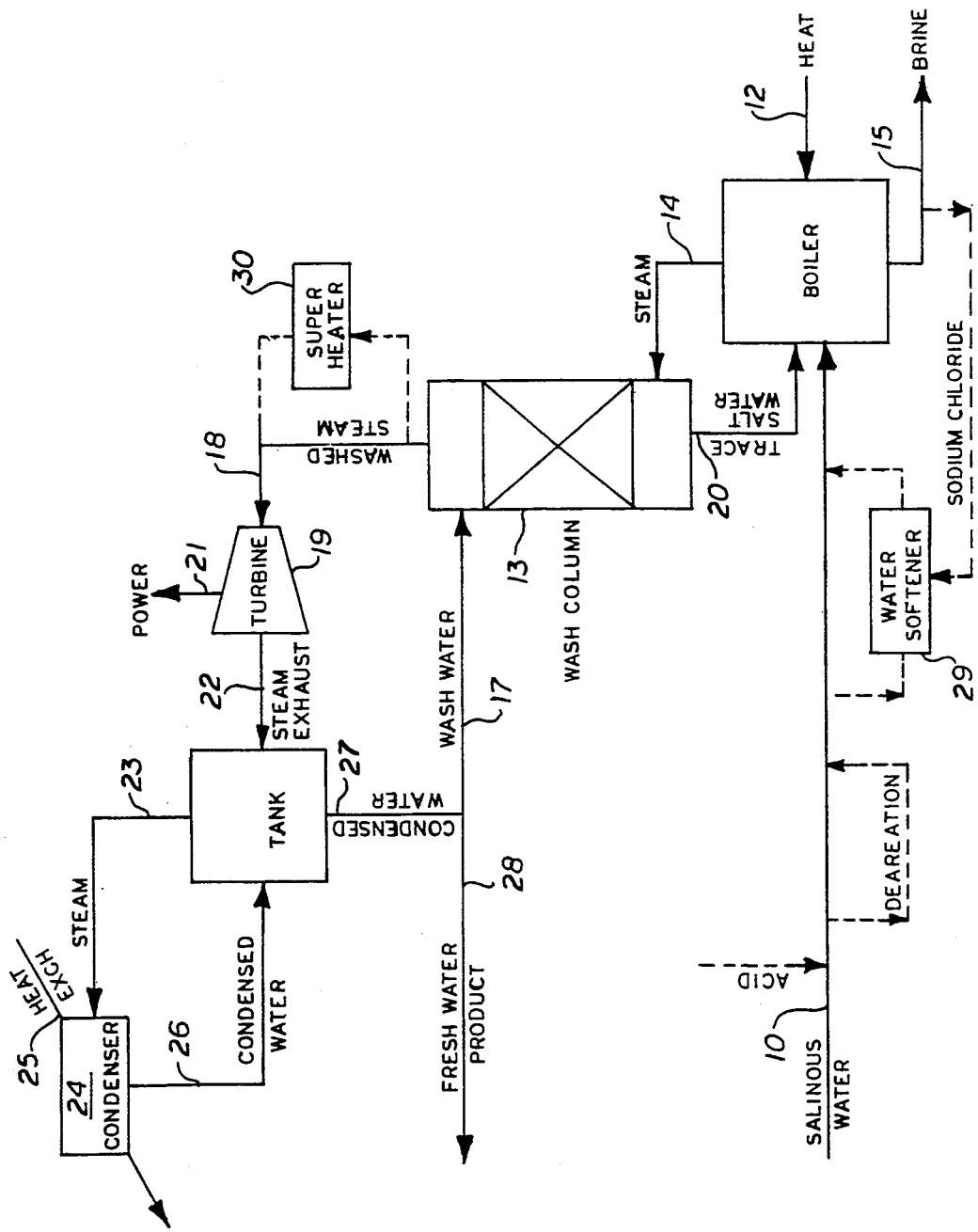

PROCESS FOR DESALINATING WATER WHILE PRODUCING POWER

BACKGROUND OF THE INVENTION

1. Field of the Invention

This invention relates generally to desalinating processes, and more particularly to a process for desalinating seawater or brine or purifying fresh containing minerals, salts, and other dissolved solids while simultaneously generating power.

2. Brief Description of the Prior Art

As world population increases, demand for fresh water and power will also increase. Pollutants and drought result in a shortage of fresh water in many locations. Therefore, it would be desirable to provide a process utilizing desalination and distillation combined with power generation whereby demand for fresh water and power can be simultaneously satisfied.

Most previous methods of desalination have been stand-alone processes. Hence, they have focused upon energy efficiency to satisfy economics. Several of the commercial methods include reverse osmosis, evaporation, and vapor recompression. Dual purpose power plants have also been utilized.

Reverse osmosis is a technology wherein fresh water is extracted from saline water by pressure. This is accomplished by circulating saline water under high pressure (i.e., 1000–2000 psig) around a loop. One portion of the loop is adjacent to a membrane. The membrane selectively allows water to pass through it while preventing the passage of most ions. Effectively, fresh water is squeezed from the saline water. Excellent energy efficiency can be achieved by this method. However, the membranes are prone to pluggage and in practice the fresh water produced is not completely free of dissolved salts. The present process, on the other hand, produces fresh water by a phase change and produces power.

Evaporation is the boiling of salinous water by the addition of heat followed by the condensation of the steam by heat exchange. Evaporators may be classified as boiling or flashing. No work is performed by the system and a large amount of energy input is required. This method is the least energy efficient of the existing methods. The present process, on the other hand, performs work and partial condensation of the steam may be accomplished by doing the work.

Vapor recompression is a technology wherein water boils itself. This is accomplished by boiling water at low pressure to produce water vapor. The water vapor is compressed and heated by doing work upon it. The heated water vapor is then condensed by heat exchange against the boiling water. The net result is that a phase change is accomplished by doing work. The energy efficiency of the system is controlled by the amount of heating of the water vapor. Small temperature increases result in high energy efficiencies and hence low operating costs for energy. Unfortunately, small temperature increases also result in large amounts of heat exchange area and hence high capital outlays. The present process, on the other hand, requires less heat exchanger area for a given duty and condensation may be at least partially achieved by doing work. With the present system, work is withdrawn from the system rather than input into the system.

Dual purpose desalination/power plants currently in use produce fresh water by using the exhaust steam as a source of heat for an evaporator. The exhaust steam is condensed against the boiler of the evaporator. As the boiler duty increases with fresh water production, the temperature of the condensing exhaust steam also increases. This reduces the thermodynamic efficiency of the power plant providing the steam. The present process does not require a second boiler and the efficiency of the power plant is not adversely affected by increasing the fresh water production rate.

Power generation using steam expansion is a common process. Condensate is fed to a boiler and heated. Steam is removed from the boiler and typically superheated. It then expands across a turbine, thereby doing work. The steam is then condensed and recycled to the boiler. A moderate amount of liquid is intermittently withdrawn from the boiler to prevent sludge accumulation. Treated fresh water is added to the system to compensate for material losses. The present process, on the other hand, withdraws the condensate as a product. Also, treated salinous water is fed to the boiler and liquid is continuously removed from the boiler to reduce scaling and prevent supersaturation by salt. In addition, the steam produced is washed by a stream of condensate to remove volatized salts and other inorganic compounds such as silica.

There are several patents which disclose various desalinating processes, some of which also generate power.

Ellis et al, U.S. Patent discloses a process which utilizes geothermal brine to generate power in a closed system with the exclusion of air to minimize corrosion. Steam from geothermal brine contains significant quantities of soluble salts including sodium and potassium chloride, calcium salts and iron and manganese salts, which have a strong corrosive action on turbine blades and related equipment. In this process, hot geothermal brine is flashed in a flash zone to form steam and concentrated brine and the steam is used to drive a power-generating turbine. The exhaust steam from the turbine is condensed and the major portion of the condensed steam is combined with the concentrated brine to form a restored brine, and the restored brine is returned to the geothermal hot brine well. There is no suggestion of a fresh water product.

Kutchinson et al, U.S. Pat. No. 3,893,299 discloses a geothermal heat recovery process wherein hot water from a geothermal well is passed through successive flash chambers operating at successively lower temperatures and the steam from each flash chamber is passed in heat exchange relationship with a working fluid operating in a closed loop which is expanded in a power extracting gas expansion device for generating power. The hot fluid at the output of each heat exchange is either combined with the steam at the output of the next flash chamber or applied to the input of the next flash chamber with the hot fluid that is not converted to steam. There is no suggestion of a fresh water product.

Spears, Jr., U.S. Pat. No. 4,078,976 discloses a potable recovery and power generating process which utilizes solar power for recovering potable water from salinous water. A portion of salinous water and an air stream are introduced into a solar radiation heat sink and heated water-containing air is withdrawn and condensed into potable drinking water. The heated salinous water is withdrawn from the solar radiation heat sink and recycled, and a part of the heated salinous water is flashed and the resultant vapor is passed through turbines to generate power and the exiting turbine vapors are cooled or condensed by contact with a second portion of the salinous water to recover addition potable water.

Pitcher, U.S. Pat. Nos. 4,267,022 and Gress, 4,310,382 disclose processes which utilize air as a working fluid for desalination and heat pumps for transferring latent heat associated with vaporizing or condensing water from one part of the process to another. Both processes require work input rather than producing work.

Mock, U.S. Pat. Nos. 4,276,124 and Elmore, 5,096,543 are essentially low-efficiency evaporator systems which utilize air as a working fluid to transport water vapor from one part of the system to another.

The present invention is distinguished over the prior art in general, and these patents in particular by a process and apparatus for desalinating seawater or brine and purifying water containing minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials are-returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously.

SUMMARY OF THE INVENTION

It is therefore an object of the present invention to provide a process for desalinating seawater or brine and/or purifying fresh water which contains minerals, salts, and other dissolved solids while simultaneously generating power.

It is another object of this invention to provide a process for desalination and distillation combined with power generation whereby demand for fresh water and power can be simultaneously satisfied.

Another object of this invention is to provide a process for desalinating seawater or brine and/or purifying water containing minerals, salts, and other dissolved solids, which overcomes the obstacles of corrosion, scaling, and steam contamination normally associated with the production of power from steam.

Another object of this invention is to provide a process for desalinating seawater or brine and/or purifying water containing minerals, salts, and other dissolved solids, which is energy efficient and performs work and wherein partial condensation of the steam is accomplished by doing the work.

Another object of this invention is to provide a process for desalinating seawater or brine and/or purifying water containing minerals, salts, and other dissolved solids, which allows reduction of the heat exchanger area for a given duty and at least partially achieves condensation by the system doing work.

Another object of this invention is to provide a process for desalinating seawater or brine and/or purifying water containing minerals, salts, and other dissolved solids, wherein work is withdrawn from the system rather than input into the system.

A further object of this invention is to provide a process for desalinating seawater or brine and/or purifying water containing minerals, salts, and other dissolved solids which eliminates the need for a second boiler commonly used in conventional dual purpose desalination/power plants and the efficiency of the power plant is not adversely affected by increasing the fresh water production rate.

A still further object of this invention is to provide a process for desalinating seawater or brine and/or purifying water containing minerals, salts, and other dissolved solids, wherein the condensate produced is withdrawn as a saleable product, treated salinous water is fed to the boiler and liquid is continuously removed from the boiler to reduce scaling and prevent supersaturation by salt, and steam produced is washed by a stream of condensate to remove volatized salts.

Other objects of the invention will become apparent from time to time throughout the specification and claims as hereinafter related.

The above noted objects and other objects of the invention are accomplished by a process and apparatus for desalinating seawater or brine and purifying water containing minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials is returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously.

BRIEF DESCRIPTION OF THE DRAWING

The sole drawing is schematic illustration of the preferred process and apparatus for desalinating seawater or brine and purifying fresh water which contains minerals, salts, and other dissolved solids while simultaneously generating power in accordance with the present invention.

DESCRIPTION OF THE PREFERRED EMBODIMENT

Referring to the drawing by numerals of reference, there is shown schematically, a preferred process for desalinating seawater or brine and purifying fresh water which contains minerals, salts, and other dissolved solids while simultaneously generating power. In the present process, condensed steam is removed as a product and saline water is used as boiler feed water. The process and apparatus described hereinafter overcomes the obstacles of corrosion,, scaling, and steam contamination normally associated with the production of power from steam derived from salinous water.

As shown in the drawing, seawater is introduced via line 10 to a boiler 11. Heat from a heat exchanger (not shown) is added to the boiler 11 via line 12. The salinous water is heated in the boiler 11 to form steam and a concentrated brine. The steam is removed from the boiler 11 and fed to a wash column 13 via line 14 and the concentrated brine is removed from boiler via line 15. The concentration of dissolved solids within the boiler liquid is regulated by controlling the rate of blowdown removal.

Boiler operation should be maintained at conditions well below the critical point of water to ensure good phase separation. Brine concentration may be regulated by using a ratio cascaded flow control loop that controls the flow rate of exiting brine and that is actuated by the flow rate of boiler feed water. Sodium ion concentration within the boiler brine should be maintained at a value exceeding 100,000 ppm.

Fresh wash water is fed to the wash column 13 from a reservoir/accumulation tank 16 via line 17. Within the wash column 13, the fresh wash water introduced via line 17 and the steam introduced via line 14 are directly contacted. Therefore, any salts and inorganic materials contained within the steam are transferred into the water. Washed steam is removed from wash column 13 via line 18 and fed to a power-generating turbine 19. Water that contains trace salts and inorganic materials is removed from the wash column 13 via line 20 and recycled to the boiler 11.

To prevent corrosion resulting from chloride attack within the boiler 11, the boiler, the wash column 13 and the associated feed and removal lines are formed of corrosion resistant material, such as titanium, hastelloy, inconel, incoloy, or monel. Monel would be a preferred material due to its cost. However, if monel is used, dissolved ammonia must be excluded from the process fluids.

After entering the turbine 19 via line 18, the washed steam expands against the turbine thereby doing work or generating power which is removed via shaft 21. Steam that may be partially condensed exits turbine 19 via line 22 and enters the reservoir/accumulation tank 16. Steam is withdrawn from the reservoir/accumulation tank 16 via line 23 and fed to a condenser 24 where condensation takes place. Heat is removed from the condenser 24 via heat exchanger 25 and fresh water (condensate) is removed from the condenser via line 26 and recycled to the reservoir/accumulation tank 16. The fresh water (condensate) is removed from tank 16 via line 27 and is divided into product water and fresh wash water. The fresh wash water is recycled to the wash column 13 via line 17 and the fresh product water is withdrawn via line 28.

By washing the steam with condensate and thereby causing the contaminants to transfer into the liquid phase from the vapor phase, steam contamination as a result of slight volatizing of components such as chlorides, sulfates, and silicates, is effectively reduced.

As shown in dotted line, scaling as a result of precipitation of calcium carbonate within the boiler and associated equipment may be effectively prevented by adding acid to the salinous feed water followed by deareation to remove the carbonate and dissolved gases, and by ion exchange using conventional water softening devices 29 to remove the calcium and magnesium ions. By maintaining sodium ion concentration within the boiler brine at a value exceeding 100,000 ppm, favorable ion selectivity is ensured in the water softener.

The boiler 11 may also serve as the source of the concentrated sodium chloride solution used for resin regeneration by the water softener. Other water treatment programs may also be utilized to prevent scaling but may be more expensive. A biocide may also be added to the feed water.

Additional water treatment such as settling, filtration, addition of foaming inhibitors, addition of scaling inhibitors, and the addition of corrosion inhibitors may also be utilized in the present process.

A superheater 30 may be installed between the wash column 13 and the turbine 19 to superheat the washed steam and prolong turbine life.

The boiler 11, the wash column 13, power-generating turbine 19, the reservoir/accumulation tank 16, the condenser 24, and the associated conduit, lines, and fittings may also be insulated such that the system operates adiabatically and thus further conserves energy.

While this invention has been described fully and completely with special emphasis upon a preferred embodiment, it should be understood that within the scope of the appended claims the invention may be practiced otherwise than as specifically described herein.

We claim:

1. A method of simultaneously generating electrical or mechanical power while converting salinous water or water containing minerals, salts, and dissolved solids into fresh water, comprising the steps of;

introducing salinous water or water containing minerals, salts, and dissolved solids into a boiler and boiling it to produce steam and concentrated brine, removing the concentrated brine from the boiler, feeding the steam produced in the boiler to a wash column, introducing fresh wash water into the stream in the wash column to wash the steam such that it is substantially free of trace salts, minerals, and dissolved solids, and the trace salts, minerals, and dissolved solids are transferred to the water in the wash column, removing the water bearing trace salts, minerals, and dissolved solids from the wash column, expanding the washed steam across a steam-operated power generating turbine to generate electrical or mechanical power and utilizing the generated power as a product, collecting, condensing, and separating the steam exhausted from the turbine, utilizing one portion of the condensate collected from the turbine as a fresh water product, and returning another portion of the condensate to the wash column to be used as the fresh wash water to wash the steam produced in the boiler to remove trace salts, minerals, and dissolved solids.

2. The method according to claim 1 including the step of adding acid to the salinous water introduced into the boiler to reduce scaling as a result of precipitation of calcium carbonate within the boiler.

3. The method according to claim 1 including the step of deareating the salinous water introduced into the boiler to remove carbonate and dissolved gases.

4. The method according to claim 1 including the steps of adding acid to the salinous water and deareating the salinous water prior to introducing it into the boiler to reduce scaling as a result of precipitation of calcium carbonate within the boiler, and to remove carbonate and dissolved gases.

5. The method according to claim 1 including the steps of softening the salinous water prior to introducing it into the boiler by ion exchange to remove calcium and magnesium ions.

6. The method according to claim 1 including the steps of softening the salinous water prior to introducing it into the boiler by ion exchange to remove calcium and magnesium ions, and utilizing concentrated sodium chloride from the brine removed from the boiler for resin regeneration in the water softening process.

7. The method according to claim 1 including the step of adding a biocide to the salinous water prior to introducing it into the boiler.

8. The method according to claim 1 including the step of superheating the washed steam prior to expanding it across the turbine.

9. A process for desalinating seawater or brine and purifying water containing minerals, salts, and dissolved solids while simultaneously generating power, comprising the steps of;

introducing salinous water or water containing minerals, salts, and dissolved solids into a boiler and boiling it to produce steam and concentrated brine, removing the concentrated brine from the boiler, feeding the steam produced in the boiler to a wash column, introducing fresh wash water into the steam in the wash column to wash the steam such that it is substantially free of trace salts, minerals, and dissolved solids, and the trace salts, minerals, and dissolved solids are transferred to the water in the wash column, removing the water bearing trace salts, minerals, and dissolved solids from the wash column, expanding the washed steam across a steam-operated power generating turbine to generate power and utilizing the generated power as a product, and collecting and condensing the steam exhausted from the turbine and utilizing it as a fresh water product.

* * * * *